United States Patent [19]

Kawazoe et al.

[11] Patent Number: 4,707,173
[45] Date of Patent: Nov. 17, 1987

[54] METHOD OF FABRICATING POROUS GLASS ROD AND APPARATUS FOR FABRICATING THE SAME

[75] Inventors: Hideyo Kawazoe; Akira Iino; Katsumi Orimo, all of Ichihara, Japan

[73] Assignee: The Furukawa Electric Co., Ltd., Tokyo, Japan

[21] Appl. No.: 863,562

[22] Filed: May 15, 1986

[51] Int. Cl.$^4$ ............................................. C03B 37/026
[52] U.S. Cl. ........................................ 65/3.12; 65/13; 65/18.2; 65/144
[58] Field of Search ..................... 65/2, 3.11, 3.12, 13, 65/18.2, 144

[56] References Cited

U.S. PATENT DOCUMENTS

| 4,123,242 | 10/1978 | Imoto et al. | 65/2 X |
| 4,259,101 | 3/1981 | Tsukuda et al. | 65/3.12 X |
| 4,435,199 | 3/1984 | Potkay | 65/3.12 |

FOREIGN PATENT DOCUMENTS

| 56-37179 | 8/1981 | Japan | 65/3.12 |
| 60-215537 | 10/1985 | Japan | 65/2 |

Primary Examiner—Robert L. Lindsay
Attorney, Agent, or Firm—Schwartz, Jeffery, Schwaab, Mack, Blumenthal & Evans

[57] ABSTRACT

A method of fabricating a porous glass rod having a reaction vessel including an elevational passage from an exhaust port of the vessel side and the top of the vessel over the interior and a burner mounted at the end in the vessel for forming glass fine particles, and a target elevationally movable and rotatably inserted from the passage into the vessel which has injecting to accumulate glass fine particles produced through the burner to form the porous glass rod at the lower end of the target rotated at a predetermined position in the reactor, and drawing the target in response to the growing velocity of the porous glass rod, wherein downward gas stream is produced along the outer periphery of the conduit in the vessel. The method is conducted by an apparatus for fabricating the glass rod. The method and apparatus can stabilize the fluidity in a reaction vessel to stabilize the outer diameter and the refractive index distribution of the glass rod in the longitudinal direction.

12 Claims, 4 Drawing Figures

METHOD OF FABRICATING POROUS GLASS ROD AND APPARATUS FOR FABRICATING THE SAME

BACKGROUND OF THE INVENTION

This invention relates to a method of and apparatus for fabricating a porous glass base material for an optical system such as optical fibers or rod lenses by means of a VAD (vapor-phase axial deposition) method.

When a porous glass base material for an optical system is fabricated by a VAD method, it is necessary to stabilize a gas stream in a reaction vessel in which an atmosphere for forming the base material is formed, and if the sufficient stability in the gas stream is not obtained, variations in the outer diameter and refractive index distribution of the porous glass base material increase.

To eliminate the variations, adequate means such as control of exhaust pressure of the reaction vessel, control of flow rate of the gas stream from the top to the interior of the reaction vessel or flow of the gas controlled under pressure have been conducted. Prior art inventions for this are disclosed, for example, in Japanese Patent Laid-open Nos. 69234/1981 and 135738/1982 official gazettes.

In FIGS. 3(a) and 3(b) showing the example of the conventional invention in Japanese Patent Laid-open No. 135738/1982, numeral 1 designates a reaction vessel having an exhaust port 2, numeral 3 designates a passage conductor inserted from the top to the interior of the vessel 1, numeral 4 designates a burner mounted at the end from the bottom to the interior of the vessel 1 for forming glass fine particles, numeral 5 designates a target, and numeral 6 designates a porous glass rod.

According to the conventional method exemplified in FIG. 3, a predetermined gas is flowed from the conduit 3 to the lower portion in case of forming the porous glass rod 6, the clearance in the conduit 3 is large at the initial stage of forming the glass rod 6 as shown in FIG. 3(a), and when the glass rod 6 is introduced into the conduit 3 as the rod 6 grows, the clearance decreases.

Therefore, as the glass rod 6 grows, the fluidity of the gas through the conduit 3 varies, and the directivity of the flame of the burner (the injecting direction of glass fine particles) in the vessel 1 also alters.

In the prior art invention disclosed in Japanese Patent Laid-open No. 69234/1981, though omitted for the description, similar phenomenon also takes place.

Since variation occurs in the directivity of the flame of the burner in the conventional method as described above, the method cannot effectively prevent the outer diameter or the refractive index distribution of the porous glass rod 6 from varying in case of fabricating the glass rod 6 having a desired length, and the control of the flow rate in the conduit 3 and the control of the pressure in the vessel 1 to be compensated are difficult.

On the other hand, if the inner diameter of the conduit 3 is increased to decrease the variation in the fluidity in the degree to be ignored, the outer diameter of the glass rod 6 is stabilized, but the flowing energy from the top of the vessel reduces in this case, the glass fine particles from the burner 4 behave at random in the vessel 1 and the stability of the refractive index distribution of the glass rod 6 is lost.

SUMMARY OF THE INVENTION

Accordingly, an object of this invention is to provide a method of and apparatus for fabricating a porous glass rod which can eliminate the abovementioned problems and can stabilize the fluidity in a reaction vessel to stabilize the outer diameter and the refractive index distribution of the glass rod in the longitudinal direction.

According to one aspect of this invention, there is provided a method of fabricating a porous glass rod having a reaction vessel including an elevational passage from an exhaust port of the vessel side and the top of the vessel over the interior and a burner mounted at the end in the vessel for forming glass fine particles, and a target elevationally movable and rotatably inserted from the passage into the vessel which comprises injecting to accumulate glass fine particles produced through the burner to form the porous glass rod at the lower end of the target rotated at a predetermined position in the reactor, and drawing the target in response to the growing velocity of the porous glass rod, wherein downward gas stream is produced along the outer periphery of the conduit in the vessel.

According to another aspect of this invention, there is also provided an apparatus for fabricating a porous glass rod having a reaction vessel including an elevational passage from an exhaust port of the vessel side and the top of the vessel over the interior and a burner mounted at the end in the vessel for forming glass fine particles, and a target elevationally movable and rotatably inserted from the passage into the vessel which comprises a cylinder having hermetical sealability coupled with the top of the passage, a glass flow passage formed to flow a downward gas flow between the upper inner periphery of the vessel and the outer periphery of the passage, and a gas inlet formed at the top of the passage.

In the invention, the glass fine particles injected from the end of the burner in the reaction vessel are accumulated on the lower end of the target of the rotary state to form a porous glass rod, and the target is drawn in response to the growing velocity of the glass rod in the same manner as the conventional method, and, when the glass rod is thus formed, a downward gas stream is advantageously produced along the outer periphery of the passage in the vessel.

When the porous glass rod is fabricated as described above in the invention, the porous glass rod passes together with the target in the passsage, and the downward gas stream is flowed to the exhaust port along the outer periphery of the passage.

Therefore, even if the clearance in the passage varies as the target first passes and the grown porous glass rod then passes through the passage, the gas stream moving downward along the outer periphery of the passage is not affected by the influence of the variation in the clearance, but exhibits always stable fluidity.

As a result, the porous glass base material is substantially constantly finished by the downward gas stream of stable state, and the mutual effect of the directivity of the flame of the burner constant with respect to the accumulating surface and the prevention of random behavior of the glass fine particles due to the downward gas stream allows the refractive index distribution over the longitudinal direction of the porous glass base material to become constant, thereby obtaining the porous glass base material having high quality and properties.

The above and other related objects and features of the invention will be apparent from a reading of the following description of the disclosure found in the accompanying drawings and the novelty thereof pointed out in the appended claims.

BRIEF DESCRIPTION OF THE DRAWINGS

FIGS. 3(a) and 3(b) are explanatory views showing the conventional example.

DESCRIPTION OF THE PREFERRED EMBODIMENTS

Embodiments of a method and apparatus for fabricating a porous glass rod of the invention will be described in detail with reference to the accompanying drawings.

Figure 1:
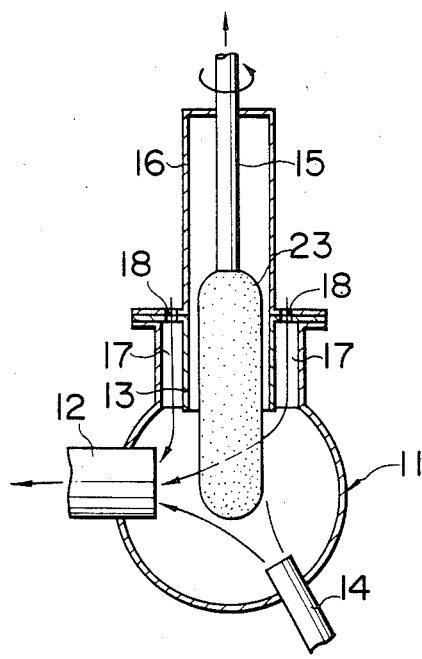
FIG. 1 is an explanatory view schematically showing an embodiment of a method of and apparatus for fabricating a porous glass rod according to the present invention.
Figure 2:
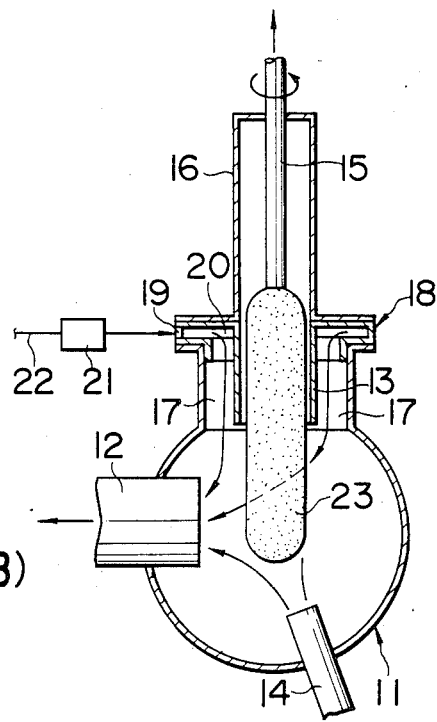
FIG. 2 is an explanatory view schematically showing another embodiment of a method of and apparatus for fabricating a porous glass rod according to the invention.
Figure 2:
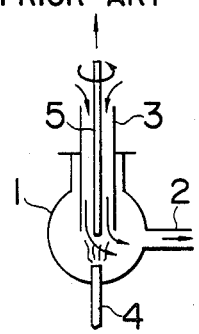
Figure 2:
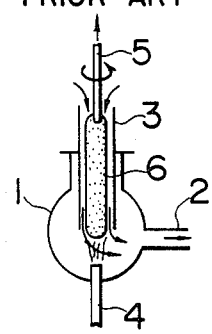

In FIGS. 1 and 2, reference numeral 11 designates a reaction vessel having an exhaust port 12, numeral 13 designates a passage provided from the top over to the interior of the vessel 11, numeral 14 designates a burner mounted at the end from the bottom to the interior of the vessel 11 for producing glass fine particles, and numeral 15 designates a target known to rotatably and elevationally movable act.

In the construction described above, a cylinder 16 having hermetical sealability is coupled with the upper surface of the passage 13, a gas flow passage 17 is formed between the upper inner periphery of the vessel 11 and the outer periphery of the passage to generate a downward gas stream, and a gas inlet 18 is formed at the upper end of the gas flow passage 17.

In the case of the first embodiment in FIG. 1, the gas inlet 18 is formed of a plurality of circular through holes perforated equidistantly on the upper surface of the vessel 11, and in the case of the second embodiment in FIG. 2, the gas inlet 18 is formed through a member having a gas guide inlet 19 and a ring-shaped gas outlet 20, and a piping system 22 having a flow rate regulator 21 is connected to the inlet 19.

In FIGS. 1 and 2, numeral 23 designates a porous glass rod.

When the porous glass rod 23 is fabricated by the apparatus exemplified as above, the target 15 is inserted at the lower end to a predetermined position in the vessel 11, and rotated to inject and accumulate product, i.e., glass fine particles produced by flame hydrolysis reaction through the burner 13 toward the lower end of the target 15.

The porous glass rod 13 is formed on the lower end of the target 15 by the accumulation of such glass fine particles, and the target 15 is drawn upwardly in the passage 13 and the cylinder 16 in response to the growing velocity of the glass rod 23. In this case, the vessel 11 is evacuated from the exhaust port 12, and predetermined gas is introduced from the piping system 22 by means of natural introduction upon evacuating of the vessel or the forcible introduction from the gas inlet 18 into the gas flow passage 17, thereby causing a downward gas flow to occur along the outer periphery of the passage 13.

As described above, the downward gas stream flowed to the exhaust port 12 along the outer periphery of the passage 13 exhibits stable fluidity not affected by the variation in the clearance in the passage 13, and causes the mutual effect of the directivity of the constant flame of the burner with respect to the accumulating area and the prevention of random behavior of the glass fine particles, thereby maintaining the outer diameter and the refractive index distribution of the glass base material 23 constant over the longitudinal direction of the base material.

When the porous glass rod 23 is fabricated according to the method of the invention described above, it is preferable to control pressure or flow rate to maintain the exhaust gas pressure in the vessel 11 or the flow rate of the downward fas stream constant. These controls are regulated by an exhaust amount regulator (not shown) in the piping system connected to the exhaust port 12 and the flow rate regulator 21 of the piping system 22 connected to the gas inlet 19.

According to the invention as described above, when the porous glass rod is fabricated by means of the VAD method, the downward gas stream is generated along the outer periphery of the passage in the reaction vessel. Therefore, the porous glass base material having constant outer diameter and refractive index distribution over the longitudinal direction can be provided by the stable downward gas stream not affected by the variation in the clearance in the passage.

On the other hand, according to the apparatus of the invention as described above, the arrangement comprises not only the exhaust port and the passage of the vessel, the burner for generating glass fine particles, and the target, but the gas flow passage formed between the upper inner periphery of the vessel and the outer periphery of the passage, the gas inlet formed at the upper end of the gas flow passage, and the cylinder having hermetical sealability is coupled with the passage. Therefore, the predetermined downward gas stream can be facilitated, and the drawing operation of the glass rod can be performed without loss of the atmosphere in the reaction vessel by utilizing the cylinder of the passage.

What is claimed is:

1. A method of fabricating a porous glass rod in a reaction vessel including a first passage at the top of the vessel, an exhaust port in one wall of the vessel and a burner mounted at the lower end in the vessel for forming fine glass particles, comprising the steps of:
   introducing a target into said passage and rotating the target;
   accumulating fine glass particles produced by the burner to form a porous glass rod at the lower end of the target rotated at a predetermined position in the reactor;
   drawing the target out of the reaction vessel through said passage in response to growth of the porous glass rod; and
   introducing a gas stream into the reaction vessel through a second passage separate from and outwardly concentric with respect to said first passage and having a constant flow resistance.

2. The method according to claim 1, further comprising the step of regulating the flow rate of the gas stream to provide a constant downward gas stream.

3. The method according to claim 1, further comprising the step of regulating the flow rate of the gas stream to provide a constant exhaust gas pressure in the vessel.

4. An apparatus for fabricating a porous glass rod, comprising:

a reaction vessel including a first passage in the top of the vessel and an exhaust port in one wall of the vessel;

a burner mounted on the lower end in the vessel for forming fine glass particles;

a target elevationally movable and rotatably inserted through said first passage into the vessel;

means for withdrawing said target and a porous glass rod formed thereon out of the reaction vessel in response to growth of the porous glass rod;

means for hermetically sealing said first passage and providing a sealed space for withdrawing said porous glass rod through said first passage;

a second passage for introducing a downward gas flow into said vessel, said second passage being separate from and outwardly concentric with respect to said first passage, said first passage and having a constant flow resistance independent of the growth of the porous glass rod; and a gas inlet formed at the top of the second passage.

5. The apparatus according to claim 4, wherein said gas inlet comprises a plurality of through holes perforated at the upper surface of the reaction vessel.

6. The apparatus according to claim 4, wherein said gas inlet is formed through a member having a gas guide inlet and a ring-shaped gas outlet.

7. The apparatus according to claim 4, wherein said gas inlet is connected with a piping system having a flow rate regulator.

8. The apparatus to claim 4, wherein said hermetic sealing means and sealed space providing means comprises a sealed cylindrical member extending above said first passage, said first passage including a cylindrical sleeve extending into the reaction vessel, and said second passage comprising a generally annular space defined between the outer surface of said cylindrical sleeve and the inside surface of the walls of the reaction vessel.

9. The method according to claim 1, wherein said gas introducing step comprises introducing a gas stream at a constant flow independent of the growth of the porous glass rod.

10. An apparatus for fabricating a porous glass rod, comprising:

a reaction vessel including a first passage in the top of the vessel and an exhaust port in one wall of the vessel;

a burner mounted at the lower end in the vessel for forming fine glass particles;

a target elevationally movable and rotatably inserted through said first passage into the vessel;

means for withdrawing said target and a porous glass rod formed thereon out of the reaction vessel in response to growth of the porous glass rod;

means for hermetically sealing said first passage and providing a sealed space for withdrawing said porous glass rod through said first passage; and means, including a second passage separate from and outwardly concentric with respect to said first passage, said first passage, for introducing a downward gas flow into said vessel independently of the growth of the porous glass rod.

11. The apparatus according to claim 10, wherein said gas introducing means includes a plurality of through holes perforated at the upper surface of the reaction vessel.

12. The apparatus according to claim 10, wherein said gas introducing means includes a piping system having a flow rate regulator therein.

* * * * *